United States Patent [19]

Rabizzoni et al.

[11] 3,883,577

[45] May 13, 1975

[54] PROCESS FOR PREPARING HIGH MOLECULAR WEIGHT POLYISOCYANATES

[75] Inventors: Antonio Rabizzoni, Busto; Aldo Trovati, Novara, both of Italy

[73] Assignee: Montedison S.p.A., Milan, Italy

[22] Filed: Sept. 21, 1973

[21] Appl. No.: 399,722

[30] Foreign Application Priority Data

Sept. 22, 1972 Italy.................................. 29524/72

[52] U.S. Cl....... 260/471 C; 260/482 B; 260/482 C
[51] Int. Cl........................................... C07c 125/06
[58] Field of Search ......... 260/471 C, 482 B, 482 C

[56] References Cited
UNITED STATES PATENTS
3,804,844 4/1974 Pews et al...................... 260/471 C Primary Examiner—Lorraine A. Weinberger
Assistant Examiner—L. A. Thaxton

[57] ABSTRACT

There is disclosed an improvement in the process for producing high molecular weight polyisocyanates by the reaction of volatile diisocyanate and an active hydrogen-containing substance. The improvement consists in using, as solvent medium for the reaction between the volatile diisocyanate and hydrogen-containing substance, a solvent, in particular acetonitrile, which has a strong affinity for the high molecular weight polyisocyanate, is only partially miscible with the aliphatic and/or cycloaliphatic hydrocarbons used as solvents for the extraction of unreacted volatile isocyanate, has a low boiling point by virtue of which it is easily distillable without causing collateral reactions and, finally, may be replaced by the solvents which are normally used in applying the high molecular weight polyisocyanates in practice, such as ethyl acetate, butyl acetate, acetic acid esters in general, alkyl carbonates, ketones, chlorinated hydrocarbons, etc.

7 Claims, No Drawings

PROCESS FOR PREPARING HIGH MOLECULAR WEIGHT POLYISOCYANATES

THE PRIOR ART

As is known, polyfunctional isocyanates are used in industry for preparing polyurethane resins by the addition of compounds containing active hydrogen, such as polyesters or polyethers containing free hydroxyl groups, to isocyanates.

As is also known, isocyanate vapors are highly toxic for humans, and that presents many problems in the preparation of polyurethane resins. The high volatility of the isocyanates has even precluded the use thereof in the formulation of paints and adhesives.

A number of expedients have been proposed for rendering the isocyanates, and particularly volatile diisocyantes, utilizable. In particular, it has been proposed to react volatile di-functional isocyanates [having the general formula R $(NCO)$ ] with polyfunctional alcohols (having the general formula $X(OH_n)$, in a ratio —NCOeg/—OHeg of about 2:1.

Theroretically, that reaction should result in the production of a high molecular weight (and consequently essentially non-volatile) polyisocyanate containing as many —NCO isocyanic groups as there are hydroxyl groups contained in the polyalcohol, i.e., in the production of products of the type:

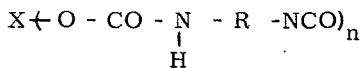

However, in practice, that result is not obtained. Using the aforesaid ratio, there still remain, in the final product, hazardous unreacted amounts of the starting volatile di-functional isocyanate and there are present compounds having a higher molecular weight than the theoretical molecular weight and which derive from the reaction of all the isocyanic groups of a same molecule of the same starting volatile difunctional isocyanate.

It is possible, by using —NCOeq/—OHeq ratios higher than 2:1, to reduce the formation of high molecular weight condensates. However, when such ratios are used, the amount of unreacted volatile diisocyanate contained in the reaction product is increased.

On the other hand, when —NCOeq/—OHeq ratios lower than 2:1 are used, the amount of unreacted volatile diisocyanate in the reaction product is reduced, but the content of high molecular weight condensates is increased.

According to the prior art, it is, in general, preferred to use —NCOeq/—OHeg ratios around 2:1 and to then remove the unreacted volatile isocyanate by chemical-physical means.

According to one prior art method, the unreacted volatile isocyanate is removed from the crude (total) reaction product by rapid distillation under vacuum. That procedure involves a number of drawbacks since, in order to insure a rapid distillation, it is necessary to operate at temperatures that insure collateral reactions which (by reaction between isocyanic and urethane groups) result in the formation of allophanic acid esters and polymers having an isocyanide structure. The result is that the finished product obtained by that process is (as compared to the crude reaction product) strongly yellowed, more viscous, and has a higher molecular weight and a lower content of isocyanic group.

According to another prior art method, the crude (total) product of the reaction between the isocyanate and polyfunctional alcohol is treated with an aliphatic or cycloaliphatic hydrocarbon which is a selective solvent for the unreacted volatile diisocyanate. The treatment with the selective aliphatic or cycloaliphatic hydrocarbon must be carried out at a starting temperature of at least 80°C and at a final temperature of about 130°C, to prevent precipitation of the high molecular weight polyisocyanate during extraction of the unreacted volatile isocyanate. Owing to the temperatures used, that procedure involves the same drawbacks as those mentioned previously.

According to another prior art method, the unreacted volatile diisocyanate is extracted from a solution of the crude (total) reaction product, in a solvent such as, for example, acetic acid esters, alkyl carbonates, ketones, chlorinated hydrocarbons which are, in general, the same as the solvents used as the liquid reaction medium, with mixtures of those solvents of the crude reaction product and aliphatic or cycloaliphatic hydrocarbons. The high molecular weight polyisocyanate is only slightly soluble in the aliphatic or cycloaliphatic hydrocarbons which show an affinity for both the unreacted volatile isocyanate and the solvents for the crude reaction product, so that, using this method it is possible to carry out the extraction of the unreacted volatile isocyanate at temperatures which avoid the collateral reactions mentioned hereinabove.

However, this last-mentioned method is not free from technological difficulties. In practice, the mixture of solvents used for the extraction of the unreacted isocyanate from the crude reaction product must be selected in dependence on the nature of the polyisocyanate and used in a particular ratio of the solvent for the particular crude reaction product to the aliphatic or cycloaliphatic hydrocarbon which ratio must be maintained constant throughout the extraction since, if an excess of the solvent for the crude reaction product is used, there is a significant loss of high molecular weight polyisocyanate during the extraction, while use of an excess of the aliphatic or cycloaliphatic hydrocarbon results in the precipitation of the high molecular weight polyisocyanate in the form of crystals which obstruct and block the extraction apparatus.

THE PRESENT INVENTION

The object of this invention is to provide a process for obtaining high molecular weight polyisocyanates which is free from the drawbacks and disadvantages of the prior art processes.

More particularly, the object of this invention is to provide a process in which there is used, in the reaction between volatile diisocyanate and the active hydrogen-containing compound, a solvent medium which has a strong affinity for the reaction product (high molecular weight polyisocyanate), is only partly miscible with the aliphatic and/or cycloaliphatic hydrocarbons used as solvents for the extraction of the unreacted volatile isocyanate, has a low boiling point and is, therefore, readily distillable without inducing the collateral reactions mentioned hereinabove and, finally, can be replaced by the solvents normally used in the practical application of high molecular weight polyisocyanates, such as ethyl acetate, butyl acetate, acetic acid esters in general, alkyl carbonates, ketones, chlorinated hydrocarbons etc.

For accomplishing the objects of this invention, acetonitrile is a solvent which satisfies all of the aforesaid criteria and which is particularly useful for accomplishing the objects of this invention.

Acetonitrile appears to be chemically inert toward the isocyanic group —NCO, is highly volatile (boiling point: 81.8°C at 760 mm Hg), has a strong affinity for high molecular weight polyisocyanate, and is only partially miscible with the aliphatic and/or cycloaliphatic hydrocarbons used as solvents for the extraction of unreacted volatile isocyanate from the crude reaction product of the volatile diisocyanate and the active hydrogen-containing compound.

Other solvents that can be used in place of acetonitrile are the higher nitriles having a boiling point comprised between 80° and 200°C, and furthermore liquid sulphur dioxide, gamma-butyrrolactone and dimethylsulphoxide.

The process of this invention is particularly useful for the preparation of adducts resulting from the reaction between diisocyanates having a low boiling point and active hydrogen-containing compounds. The useful low boiling diisocyanates include, without distinction, alkyl or alkylaryl diisocyanates of the type of ethylene diisocyanate (EDI), hexomethylene diisocyanate (HDI), diarylmethane diisocyanate (MDI), toluene diisocyanate (TDI), ethyl benzene diisocyanate (EBDI), cumene diisocyanate, etc.

Active hydrogen-containing compounds which are useful in the practice of this invention include, without distinction, the aliphatic diols such as ethylene glycol, propylene glycol, diethylene glycol, dipropylene glycol, butanediol, hexanediol, etc., the triols such as glycerol, butanetriol, hexanetriol, trimethylolethane, trimethylolpropane, etc., and the polyhydric alcohols such as pentaerythritol, diglycerol, triglycerol, sorbitol, mannitol, etc.

The process of this invention can be carried out by first feeding the diisocyanate and solvent into the reactor, and then adding the polyvalent alcohol to the resulting solution, or by feeding batchwise to the reactor the diisocyanate, polyhydric alcohol and solvent, in that order.

In any case, feeding of the reactants and solvent to the reactor must be such that the isocyanic equivalents/hydroxy equivalents ratio is higher than 2 and is preferably comprised between 2 and 3.

The reaction is conducted at temperatures which depend on the reactivity of the diisocyanate employed and which are generally comprised between 20° and 100°C.

The extraction of the crude (total) reaction product can be carried out in multiple steps and batchwise by adding the extracting solvent to the reactor, stirring the resulting mass, and subsequently decanting and then removing the upper layer containing the unreacted volatile diisocyanate almost all of which is dissolved in the extracting solvent.

The extraction can be profitably carried out continuously by feeding the crude reaction product into the top of a column provided with one or more steps and effecting the extraction countercurrently.

The extracting solvent may consist of aliphatic and/or cycloaliphatic hydrocarbons, e.g., petroleum ether, n-hexane, n-heptane, cyclohexane, or methylcyclohexane. Preferably, it consists of a mixture of aliphatic and/or cycloaliphatic hydrocarbons saturated with the reaction solvent. The extraction temperature may vary, depending on the nature of the polyisocyanate formed in the reaction but in general is in the range from 20° to 50°C.

The high molecular weight polyisocyanate obtained by the process of this invention is free, or practically free, of the starting volatile diisocyanate which, after removal of the reaction solvent (e.g., acetonitrile) by distillation, is redissolved in a conventional solvent such as, e.g., ethyl acetate, butyl acetate, acetic acid esters in general, alkyl carbonates, ketones, chlorinated hydrocarbons, etc.

In order to satisfactorily remove the reaction solvent, it is preferred to remove the bulk thereof by distillation under atmospheric pressure and then strip off the last traces of the solvent under vacuum and stirring while exercising care not to exceed 90°C.

If the melting point of the high molecular weight polyisocyanate is such that the product is solid at 90°C and not stirrable, it is advisable, before stripping off the final traces of acetonitrile, to add a quantity of a high boiling solvent which is chemically inert with respect to the isocyanic group, such as isophorone or ethyl glycol acetate and to then remove the last traces of acetonitrile by fractional distillation.

The quantity of high boiling solvent required to keep the mass sufficiently fluid and stirrable varies depending on the nature of the high molecular weight polyisocyanate formed. The minimum quantity required is normally comprised between 2 and 6% by weight of dry polyisocyanate.

The final solutions of the high molecular weight polyisocyanate obtained according to this invention, in addition to being free of the starting volatile polyfunctional isocyanate, show a very low color index, a low viscosity with respect to the non-volatile material content, a high content of free isocyanate groups, and may be used efficiently and without any hazard to the health of the operators in compositions for paints, lacquers and adhesives.

The following example is given to illustrate the invention and is not intended to be limiting.

EXAMPLE 1

1.176 g (6.76 mols) of toluene diisocyanate in isomeric admixture containing 80 percent of isomer 2,4 and 20 percent of isomer 2,6 are fed into a reactor provided with a stirrer, a cooler, a dropping funnel, a thermometer and kept under an atmosphere of dry $N_2$. 420 g of anhydrous acetonitrile are then added and a homogeneous mixture containing 142.6 g (1.06 mols) of trimethylolpropane and 62.6 g (0.69 mols) of 1,3 butanediol previously dehydrated is added slowly and dropwise and under efficient stirring to the obtained solution.

The addition is started at room temperature at such a rate that the heat developed by the reaction does not cause the temperature to rise above 40°C. Once the addition of the polyols is completed, the temperature is kept at 40°C for about 1 hour, then, in 30 minutes, the temperature is raised to 60°C and the reaction is allowed to continue until the —NCO percentage drops to 20.8. The whole is quickly cooled and another 240 g of anhydrous acetonitrile are added.

The obtained solution is fed into a column provided with a porous diaphragm on its bottom, a longitudinal helical stirrer and an overflow pipe. From the bottom of the column, a homogeneous mixture of n-heptane saturated with acetonitrile is fed, which is finely dispersed by the porous diaphragm and bubbles through the stationary phase consisting of the polyisocyanate solution.

The extraction is considered complete when the heptane coming out from the overflow pipe is practically free of toluene diisocyanate. The solution which remains in the column is fed into a reactor and heated to a maximum temperature of 90°C to remove the actonitrile; to remove the last traces, it is advisable to operate in the end under vacuum.

At this temperature, the polyisocyanate is in the form of a very viscous mass and can be easily disssolved in the desired solvent by simple addition of the latter to the mass under stirring.

Dissolved in ethyl acetate containing 75 percent of non-volatile substance, it is a liquid with a viscosity of about 2300 cP at 20°C, practically colorless (Gardner index '53 <1) with an unreacted toluene diisocyanate content of 0.3 percent by weight and an isocyanic groups content of 13.6 percent by weight.

We claim:

1. Process for preparing high molecular weight polyisocyanates by reaction of addition between an alkyl or alkylaryldiisocyanate and an active hydrogen-containing compound selected from aliphatic diols, triols and polyhydric alcohols, characterized in that
    a. The alkyl or alkylaryldiisocyanate is reacted at a temperature comprised between 20° and 100°C with the active hydrogen-containing compound in a solvent having a strong affinity for the reaction product, said solvent being only partly miscible with aliphatic and/or cycloaliphatic hydrocarbons and having a low boiling point, the molar ratio isocyanic equivalents —NCO/hydroxy equivalents —OH being comprised between 2 and 3;
    b. The alkyl or aryldiisocyanates are extracted at a temperature from 20°to 50°C from the solution obtained in (a) either batchwise or continuously with an extracting mixture comprising aliphatic and/or cycloaliphatic hydrocarbons, preferably in admixture with the same reaction solvent medium.

2. The process according to claim 1, in which the aliphatic and/or cycloaliphatic hydrocarbons used to extract the alkyl or alkylaryl diisocyanates from the solution obtained in (a) are mixed with the reaction solvent.

3. The process according to claim 1, in which the alkyl or alkylaryl diisocyanate is selected from the group consisting of ethylene diisocyanate, hexamethylene diisocyanate, diaryl methane diisocyanate, toluene diisocyanate, cumene diisocyanate and ethylbenzene diisocyanate.

4. The process according to claim 1, in which the reaction solvent is acetonitrile.

5. The process according to claim 1, in which the aliphatic diol is selected from the group consisting of ethylene gycol, propylene glycol, diethylene glycol, dipropylene diol, butane diol and hexane diol.

6. The process according to claim 1, in which the triol is selected from the group consisting of glycerol, butanetriol, hexanetriol, trimethylolethane and trimethylolpropane.

7. The process according to claim 1, in which the polyhydric alcohol is selected from the group consisting of pentaerytriol, diglycerol, triglycerol, sorbitol and mannitol.

* * * * *